FLAME-RESISTANT ACRYLONITRILE COPOLYMERS WITH HIGH RECEPTIVITY TO ACID DYES

Iyohiko Nakanome, Kenji Takeya, Hiroshi Suzuki, and Yasuhiro Kitagawa, Saidaiji, Japan, assignors to Japan Exlan Company Limited, Osaka, Japan
No Drawing. Filed June 13, 1968, Ser. No. 737,309
Claims priority, application Japan, July 1, 1967, 42/42,470; Sept. 26, 1967, 42/62,094
Int. Cl. C08f *15/40, 37/00, 45/24*
U.S. Cl. 260—29.6      2 Claims

ABSTRACT OF THE DISCLOSURE

Acrylonitrile copolymers which have high receptivity to acid dyes and are flame resistant, and are thus useful in making carpeting, curtains, etc. as well as wearing apparel, etc., are ternary polymers composed of acrylonitrile, vinylidene chloride, and a basic monomer of the type of the dimethylaminoethyl and diethylaminoethyl esters of acrylic acid and of methacrylic acid, and the corresponding N-substituted aminopropyl and aminobutyl esters, etc.; or copolymers consisting of acrylonitrile, vinylidene chloride, a basic monomer of the afore-indicated type and one or more neutral ethylenically unsaturated compounds (i.e. methyl acrylate, methyl methacrylate, vinyl acetate, styrene).

---

This invention relates to flame-resistant acrylonitrile copolymers highly receptive to acid dyes and production thereof. More particularly, this invention relates to ternary polymers composed of acrylonitrile, vinylidene chloride and a monomer of general Formula 1, or copolymers composed of acrylonitrile, vinylidene chloride, a monomer of general Formula 1 and one or more neutral ethylenically unsaturated compounds.

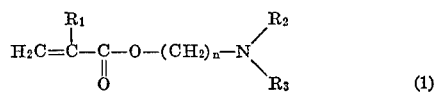

(1)

(wherein $R_1$ is hydrogen or methyl radical, each of $R_2$ and $R_3$ stands for methyl or ethyl radical, and $n$ is an integer of from 2 to 4).

Since fibers of acrylonitrile polymers or copolymers are intrinsically devoid of flame-resistance, they are not satisfactory for certain applications such as carpeting, curtains and other home furnishings, as well as for use as wearing apparel for babies and children.

To remedy the deficiency of acrylic fibers in flame-resistance, a method has been proposed which involves the use of acrylonitrile copolymers made up of acrylonitrile and a monomer capable of imparting flame-resistance to the resulting copolymers. An alternative is to prepare a blend composition of acrylonitrile polymers or copolymers with flame-resistant substances and to form the blend into fibers. Still another method comprises molding acrylonitrile polymers or copolymers into a filamentary form and then treating the same with a flame-resistant agent.

However, in the method in which an acrylonitrile polymer or copolymer is blended with a flame-resistant substance and the blend is formed into fibers, the flame-resistant substance occurs within the resulting fiber merely in a physically dispersed state and, therefore, it is easy to get removed during such processes as spinning, heat-treatment and dyeing, so that the final product cannot have satisfactory flame-resistance. It should also be noticed that the flame-resistant substances so removed from the fiber could corrode the equipments in these processes. Furthermore, when solid flame-resistant substances are used, various troubles are encountered in the spinning process, one of said troubles being the clogging of nozzle orifices which would render the spinning operation difficult. Moreover, the fibers containing solid flame-resistant materials have many serious disadvantages from the standpoint of product design, e.g. deficiencies in luster, reduction in stability against light and in abrasion resistance of the dyed fiber, and adverse influences on the dyeability of acrylic fiber which normally would be excellent.

In the method wherein acrylonitrile polymers or copolymers are formed into fibers, which are then treated with flame-resistant agents, the latter agents merely stick to the surface of the fibers and, therefore, the method provides the fibers with only poor washing resistance and durability in respect of the flame-resistant agents. Thus, on prolonged usage of the product, its flame resistance diminishes considerably or disappears completely.

On the other hand, the flame-resistant acrylonitrile copolymer fibers prepared by copolymerizing acrylonitrile with a halogen-containing monomer, such as vinyl chloride, vinyl bromide or vinylidene chloride, which is known to be capable of imparting flame resistance to the copolymer, are excellent in flame-resistance, but are considerably lacking in dyeability which is one of the notable characteristics of acrylic fiber in general.

It is a principal object of the present invention to provide acrylonitrile copolymers which are not only highly receptive to acid dyes but also flame-resistant.

More particularly, an object of the invention is to provide ternary polymers consisting of acrylonitrile, vinylidene chloride and a basic monomer which may be represented by general Formula 1, or copolymers consisting of acrylonitrile, vinylidene chloride, a basic monomer of general Formula 1 and one or more neutral ethylenically unsaturated compounds.

Other objects of the invention will become apparent as the following description proceeds.

The above-mentioned objects of the invention may be accomplished by copolymerizing at least 65% or more by weight of acrylonitrile, 5% to 15% by weight of vinylidene chloride and 1% to 15% by weight of a basic monomer of general Formula 1, and if desired 1% to 15% by weight of one or more neutral ethylenically unsaturated compounds.

The basic monomers of general Formula 1, which are used in accordance with the invention, include, among others, the dimethylaminoethyl and diethylaminoethyl esters of acrylic acid and of methacrylic acid, the corresponding N-substituted aminopropyl esters, N-substituted aminobutyl esters and the like. If the amount of this monomer is less than 1%, the resulting copolymer would not sufficiently be receptive to acid dyes, while the use of such monomer in an amount exceeding 5% will adversely affect the properties of the fiber.

If the amount of vinylidene chloride, which is to be employed according to the invention for the purpose of imparting flame-resistance to the resulting copolymers, is less than 5% by weight, the fiber formed from the copolymer will not have sufficient flame-resistance. On the other hand, should the amount of vinylidene chloride exceed 15% by weight, the fibers will possess only reduced fastness to sunlight or considerably reduced dyeability.

It should further be noted that, in the method of this invention, vinylidene chloride acts as an effective monomer for the attainment of flame resistance because the use of this monomer not only imparts flame resistance to the fiber formed from the resulting copolymer but does not adversely affect the thermal properties of the fiber.

In addition, since vinylidene chloride is liquid at room temperature, it is not necessary to employ any special polymerization method or equipment for the copolymerization of the monomer mixture in accordance with the invention. Thus the polymerization can be conducted at atmospheric pressure by the aqueous suspension polymerization technique conventionally adopted for the polymerization or copolymerization of acrylonitrile.

Addition of a neutral ethylenically unsaturated compound as a fourth component according to this invention is preferable for the purpose of obtaining improvements in the shrinkage of the fibers made from copolymers comprising acrylonitrile, vinylidene chloride and a basic monomer of general Formula 1 in the course of heat-relaxing treatment. To obtain a satisfactory shrinkage, the neutral ethylenically unsaturated compound should be employed in amounts from 1% to 15% by weight. The objects of this invention can also be accomplished by employing two or more different types of neutral ethylenically unsaturated compounds. If the amount of such a neutral ethylenically unsaturated compound is less than 1%, the contribution of the neutral ethylenically unsaturated compound to the shrinking tendency of the fiber in the heat-relaxing process will be almost negligible. On the other hand, the use of said neutral ethylenically unsaturated compound in an amount exceeding 15 percent will have undesirable influences on various properties of the fiber.

The neutral ethylenically unsaturated compounds mentioned above include, for example, the alkyl (e.g. methyl, ethyl, propyl, butyl, etc.) esters of acrylic acid and of methacrylic acid, the aryl (e.g. phenyl, benzyl, etc.) and aryl-alkyl esters of said acids, styrene and its derivatives such as alpha-methylstyrene, p-aminostyrene, etc., vinyl esters such as vinyl acetate, vinyl formate, etc., aldehyde-containing monomers such as acrolein, methacrolein, etc., acrylamide and methacrylamide, as well as their derivatives, alpha-alkyl-substituted acrylonitrile such as methacrylonitrile, the unsaturated monomers which do not contain acidic dissociable groups such as carboxyl, sulfonate, etc. in the respective molecules, such as methylvinylketone, phenylvinylketone and the like.

An acrylonitrile copolymer containing a large amount of vinylidene chloride is soluble in certain organic solvents such as dimethylformamide, λ-butylolactone, etc. but is difficult to be dissolved in a concentrated aqueous solution of a thiocyanate.

It has been found that such acrylonitrile copolymer containing a relatively large amount of vinylidene chloride produced according to this invention is easily soluble in an aqueous solution of thiocyanate of a concentration satisfying the following Formula A or B:

$$5.3 \leq x \leq 7.4 \quad 47 \leq y \leq 60 \quad \text{(A)}$$

$$7.4 < x \leq 12.0 \quad 0.8x + 41.1 \leq y \leq 60 \quad \text{(B)}$$

wherein $x$ is the content (percent by weight) of vinylidene chloride in the copolymer and $y$ is the concentration (percent by weight) of the aqueous solution of the thiocyanate.

Thus, by satisfying the above Equation A or B, an acrylonitrile copolymer containing vinylidene chloride may homogeneously be dissolved in an aqueous solution of a thiocyanate to prepare a spinning solution suitable for producing filaments. The spinning may be conducted in a well known manner.

Among useful thiocyanates are sodium thiocyanate, potassium thiocyanate, calcium thiocyanate, ammonium thiocyanate, etc.

As the copolymer component to be employed for the purpose of making the acrylic fibers dyeable with acid dyes, vinylpyridines such as 2-methyl-5-vinylpyridine are known. However, acrylic fibers containing such vinyl pyridines have the disadvantage that they are substantially undyeable with acid dyes when pH of dyeing bath is higher than 4. In contrast, since the basic monomer of general Formula 1 features a higher degree of basic dissociability of its basic groups than the vinylpyridines (a higher degree of basic dissociability is equivalent to a higher receptive capacity for hydrogen ion and, therefore, the term means that the groups are liable to become positively charged), the fibers formed from acrylonitrile copolymers containing such a basic monomer of general Formula 1 as a comonomer are dyeable using an acid-dye bath over a wide pH range of 2 to 7. Therefore, whereas the conventional acrylic fibers dyeable with acid dyes lose their affinity for such dyes at pH 4 and higher, the fibers formed from acrylonitrile copolymers produced by the method of this invention exhibit a considerably high affinity for anionic dyes such as acid dyes, direct dyes, etc., due to the fact that all the basic groups contained in the copolymer fibers remain active even in the neutral pH range, with the dye exhaustion by the fibers in that high pH range being the same as at lower pH values.

Therefore, in the multi-colored effect dyeing of textile webs or assemblies made up of acrylonitrile copolymer fibers manufactured by the method of this invention and cationic-dye-receptive acrylic fibers containing acidic groups such as sulfonic acid by mix-spinning, mix-twisting or mix-weaving, satisfactory multi-color products substantially free from interstaining can be successfully obtained, even when use is made of cationic dyes which would be denatured when use in lower pH regions, because the dyeing can be carried out in the neighborhood of neutrality.

The foregoing characteristics cannot be expected with acid-dye-receptive fibers made up of the conventional acrylonitrile copolymers containing vinylpyridines.

Thus, whereas the conventional acrylonitrile copolymers containing vinylidene chloride feature not only considerably poor dyeability but also very low dyeing velocity and, therefore, it is necessary that, to attain the desired shade, the dyeing operation should be carried out at considerably high temperatures and pressures for a more extended period of time as compared with the dyeing conditions conventionally adopted for regular acrylic fibers, the fibers formed from acrylonitrile copolymers obtained by the method of this invention can be dyed under the same conditions as those adopted in the dyeing of the regular acrylonitrile copolymer fibers, i.e. at atmospheric pressure and in the neighborhood of 100° C. for 60 to 90 minutes, so that the productivity in the dyeing department can be increased and the dyeing cost considerably reduced. It is permissible, for the purpose of attaining further improvements in flame resistance of the acrylonitrile copolymers made by the method of this invention, to add such flame proofing agents as antimony trioxide, tricresyl phosphate, etc. in the course of polymerization or in the preparation of spinning solutions.

As the technique by which the acrylonitrile copolymers of this invention can be obtained, any desired polymerization techniques, such as bulk polymerization, emulsion polymerization, solution polymerization and suspension polymerization, can be successfully utilized. The polymerization initiators which can be employed include azo compounds such as azobisisobutylonitrile, peroxides such as benzoyl peroxide, potassium persulfate, etc. and redox catalysts such as sodium sulfite-sodium chlorate. It is also possible to initiate the polymerization reaction by means of light or radiation, while the polymerization system may be either a batch system or a continuous system, or further it may be a combination of the two systems.

The polymerization temperature may be selected suitably depending upon the particular polymerization method. However, it is preferable to conduct the polymerization at a temperature of 20–80° C.

The following examples are given to illustrate the present invention and should by no means be construed as limiting the scope of the invention. Unless otherwise indicated, all percents and parts in the examples are by weight. It should also be understood that, in the examples, C. I. means the Colour Index, 2nd Edition, 1956, and Supplement, 1963, published by The Society of Dyers and Colourists, Bradford, England, and The American Association of Textile Chemists, and Colourists, Lowel, Mass., U.S.A.

EXAMPLE 1

While a continuous polymerization vessel equipped with a stirrer agitated at a constant speed was maintained at a temperature of 55° C. by a jacket, a monomer mixture, which is given in Table 1 below, catalysts consisting of sodium chlorate and sodium sulfite in a molar ratio of 1 to 3, suitable amounts of nitric acid and pure water were fed to the vessel so that those materials would stay within the vessel for an average of 70 minutes, and the reaction product was continuously withdrawn to obtain the copolymer composed predominantly of acrylonitrile. The amount of the monomer mixture present in the charge is 24 percent, and the amount of nitric acid was charged to the vessel so that the internal pH of the vessel was maintained at pH 2.3. The catalyst was also continuously fed into the polymerization vessel at such a rate that the sodium chlorate was 0.6% relative to the monomers. The granular polymer was separated from the polymer slurry withdrawn from the polymerization vessel and was repeatedly washed with water. 10 parts of the resulting acrylonitrile copolymer was dissolved in 90 parts of a 50% aqueous solution of sodium rhodanate to prepare a spinning solution. This solution was extruded through a spinnerette having 50 orifices, 0.09 mm. each in diameter, into a coagulating bath comprising a 12% aqueous solution of sodium rhodanate, and the resulting tow was washed with water, followed by stretching to 10 times its initial length, whereupon a fiber was obtained.

The results of the polymerization reactions, as well as the dyeability of the fiber spun from each resulting copolymer, are set forth in Table 1.

It will be apparent from Table 1 that the fiber formed from acrylonitrile copolymers of this invention which contained N,N-dimethylaminoethyl methacrylate, vinylidene chloride and methyl acrylate featured considerable improvements in both the affinity for acid dyes and shrinkage.

2.0 g. of the above fiber was sufficiently loosened, and, then, charged into a 100 ml. beaker. And 20 mg. of granular hexamethylenetetramine was placed on the fiber as an ignition source, which was then lighted with a match, and the flame resistance of the fiber was evaluated by measuring the time in seconds that elapsed and the amount of combustion before the flame was extinguished. On the other hand, the copolymer fiber prepared by the same method as this example but consisting of 90% acrylonitrile and 10% methyl acrylate without containing vinylidene chloride was not self-extinguishing but burned out completely in 150 seconds. In contrast, the fiber produced in this example required as short as 25 seconds before it self-extinguished, with the amount of combustion also being as low as about 10%, and was found to be self-extinguishing.

TABLE 1

| Monomers charged, percent | | | | | Composition of copolymer, percent | | | | | | |
|---|---|---|---|---|---|---|---|---|---|---|---|
| Acrylo-nitrile | Methyl acrylate | Vinylidene chloride | N,N-dimethyl-amino-ethyl methac-rylate | Conversion of polym-erization (percent) | Acrylo-nitrile | Methyl acrylate | Vinylidene chloride | N,N-di-methyl-amino-ethyl methac-rylate | Molecular weight of co-polymer [1] | Dye-ability of fiber [2] | Shrinkage (percent) [3] |
| 84 | 7 | 9 | 0 | 79.6 | 84.4 | 6.3 | 9.3 | 0 | 55,500 | 0.02 | 29.6 |
| 84 | 6 | 9 | 1 | 77.5 | 83.0 | 5.8 | 9.5 | 1.7 | 55,900 | 0.17 | 29.6 |
| 84 | 5 | 9 | 2 | 76.1 | 82.4 | 5.0 | 9.6 | 3.0 | 55,100 | 0.40 | 30.9 |
| 84 | 4 | 9 | 3 | 76.5 | 82.1 | 4.0 | 10.1 | 3.8 | 55,900 | 0.66 | 28.7 |
| 84 | 3 | 9 | 4 | 77.5 | 81.3 | 4.6 | 9.4 | 4.7 | 56,000 | 0.89 | 29.3 |
| 90 | 0 | 9 | 1 | 76.3 | 89.0 | 0 | 9.4 | 1.6 | 55,200 | 0.08 | 18.1 |

[1] Determined from the viscosity of each sample as measured in γ-butyrolactone at 30° C., using Staudinger's equation.
[2] The amount of C.I. Acid Blue 158 (C.I. No. 14880) adsorbed on each fiber sample when the latter was dyed at 99° C. and pH 2.7 for 1 hour as pressed in weight percentage relative to the fiber.
[3] Shrinkage of each sample as measured after a steam heat treatment at 125° C.

EXAMPLE 2

A 1.5-liter glass flask equipped with a stirrer was supplied with a dispersion of 10 parts of a monomer mixture consisting of 87 parts of acrylonitrile, 10 parts of vinylidene chloride and 3 parts of N,N-dimethylaminoethyl methacrylate in 90 parts of deionized water, followed by the addition of a sodium chlorate-sodium sulfate (mole ratio: 1/3) redox catalyst in the amount of 1.0 percent relative to the monomer mixture. The system pH was adjusted to pH 1.8 with nitric acid, and under constant stirring, the polymerization reaction was conducted at 35° C. for 1 hour in a stream of nitrogen gas. The above procedure gave copolymers consisting of 90.0% acrylonitrile, 6.1% vinylidene chloride and 3.9% N,N-dimethylaminoethyl methacrylate in a yield of 55.8%. This copolymer was dyed under the following conditions.

Copolymer—1.0 g.
C.I. Acid Red (C.I. No. 15620)—0.2 g.
Water—100 ml.
Dyeing bath pH (adjusted with acetic acid)—pH, 2.5
Dyeing temperature—105° C.
Dyeing time—1 hour The copolymer dyed above was dissolved in γ-butyrolactone (concentration 0.05%), and after filtering, the absorbency of the solution ($-\log T$) was measured with a photoelectric colorimeter at 530 mμ. The result: 1.15.

The absorbency, at 530 mμ, of the copolymer consisting of 91.5% acrylonitrile and 8.5% vinylidene chloride, not containing N,N-dimethylaminoethyl methacrylate, which had been prepared in the same manner as this example and dyed under the foregoing conditions was 0..03. The greater the absorbency, the higher the degree of coloration. Thus, the dyeability of the copolymer produced by the method of this invention was superior to that of the above control.

EXAMPLE 3

Using the same procedure as that described in Example 2, the monomers set forth in Table 2 were copolymerized and the resulting copolymers were subjected to the same measurements as those carried out in Example 2.

It will be apparent from Table 2 that whereas the copolymer containing none of N,N-dimethylaminoethyl methacrylate was not receptive at all to acid dyestuffs, the copolymers of this invention, which contained N,N-dimethylaminoethyl methacrylate, showed improvements in receptivity to acid dye, which were proportional to the amounts of N,N-dimethylaminoethyl methacrylate.

TABLE 2

| Monomers charged, percent | | | | Conversion of polymerization (percent) | Intrinsic viscosity [1] | Dyeability of polymer [2] |
|---|---|---|---|---|---|---|
| Acrylo-nitrile | Methyl-acrylate | Vinylidene chloride | N,N-dimethyl aminoethyl methacrylate | | | |
| 83 | 4 | 10 | 3 | 55.1 | 0.83 | 1.00 |
| 83 | 5 | 10 | 2 | 45.3 | 1.03 | 0.53 |
| 83 | 6 | 10 | 1 | 39.8 | 1.10 | 0.18 |
| 83 | 7 | 10 | 0 | 38.7 | ---- | 0.03 |
| 78 | 13 | 6 | 3 | 56.2 | 1.21 | 1.27 |

[1] Measured in dimethylformamide at 30° C.
[2] By the dyeability test carried out in Example 2.

EXAMPLE 4

Using the procedure described in Example 2, the monomer shown in Table 3 were copolymerized, and the resulting copolymers were tested for their dyeability. The results showed that the copolymers of this invention featured a considerably improved receptivity to acid dyes.

TABLE 3

| Monomers charged, percent | | | | Conversion of polymerization (percent) | Intrinsic viscosity [1] | Dyeability of polymer [2] |
|---|---|---|---|---|---|---|
| Acrylo-nitrile | Methyl methacrylate | Vinylidene chloride | N,N-dimethyl aminoethyl methacrylate | | | |
| 83 | 4 | 10 | 3 | 46.0 | ---- | 0.21 |
| 83 | 5 | 10 | 2 | 11.4 | 1.21 | 0.57 |
| 83 | 6 | 10 | 1 | 13.8 | 1.00 | 0.99 |
| 83 | 7 | 10 | 0 | 59.4 | ---- | 1.14 |

[1] The intrinsic viscosity of each sample was measured in the same manner as in Table 2.
[2] Each copolymer was dyed in the same manner as in Example 2, and after diluting to 40 times, the exhausted bath was tested for its absorbancy (−log T) with a photoelectric colorimeter at 530 mµ. The absorbancy value was equivalent to the dyeability of the copolymer. The smaller the absorbancy value, the more dye the copolymer has adsorbed.

EXAMPLE 5

Following the same procedure as that described in Example 2, the monomers set forth in Table 4 below were copolymerized, and the dyeability of each resulting copolymer was measured in the same manner as in Example 2. The results were identical with those attained in Example 2.

TABLE 4

| Monomers charged, percent | | | | Conversion of polymerization (percent) | Intrinsic viscosity [1] | Dyeability of polymer [2] |
|---|---|---|---|---|---|---|
| Acrylo-nitrile | Vinyl acetate | Vinylidene chloride | N,N-dimethyl aminoethyl methacrylate | | | |
| 83 | 4 | 10 | 3 | 50.5 | 0.89 | 0.87 |
| 83 | 5 | 10 | 2 | 30.2 | 0.77 | 0.89 |
| 83 | 6 | 10 | 1 | 38.7 | 1.01 | 0.18 |
| 83 | 7 | 10 | 0 | 56.6 | ---- | 0.04 |

[1] The intrinsic viscosity of each sample was measured in the same manner as in Table 2.
[2] The dyeability of each copolymer was measured in the same manner as in Example 2.

EXAMPLE 6

Following the same procedure as that described in Example 2, the monomers set forth in Table 5 below were copolymerized for 2 hours, and the dyeability of each resulting copolymer was measured in the same manner as in Example 2. The results were comparable to those obtained in Example 2.

TABLE 5

| Percent | | | | Conversion of polymerization (percent) | Intrinsic viscosity [1] | Dyeability of polymer [2] |
|---|---|---|---|---|---|---|
| Acrylo-nitrile | Methyl-acrylate | Vinylidene chloride | N,N-dimethyl aminoethyl methacrylate | | | |
| 83 | 4 | 10 | 3 | 42.1 | 0.65 | 1.25 |
| 83 | 5 | 10 | 2 | 27.6 | 0.69 | 1.07 |
| 83 | 6 | 10 | 1 | 23.9 | 0.62 | 0.35 |
| 83 | 7 | 10 | 0 | 58.7 | ---- | 0.03 |

[1] The intrinsic viscosity of each sample was measured in the same manner as in Table 2
[2] The dyeability of each copolymer was measured in the same manner as Example 2

EXAMPLE 7

Following the procedure described in Example 2, the monomers set forth in Table 6 below were copolymerized for 2 hours, and the dyeability of each resulting copolymer was measured in the same manner as in Example 2. The results were comparable with those attained in Example 2.

TABLE 6

| Monomers charged, percent | | | | Conversion of polymerization (percent) | Intrinsic viscosity [1] | Dyeability of polymer [2] |
|---|---|---|---|---|---|---|
| Acrylonitrile | Styrene | Vinylidene chloride | N,N-diethylaminoethyl methacrylate | | | |
| 83 | 4 | 10 | 3 | 25.7 | 0.82 | 1.44 |
| 83 | 5 | 10 | 2 | 14.3 | 0.77 | 1.00 |
| 83 | 6 | 10 | 1 | 17.0 | 0.80 | 0.47 |

[1] The intrinsic viscosity of each sample was measured in the same manner as in Table 2.
[2] The dyeability of each copolymer was measured in the same manner as in Example 2.

EXAMPLE 8

An acrylonitrile copolymer containing 2-methyl-5-vinylpyridine which is conventionally known as a copolymer component capable of rendering the copolymer receptive to acid dyes, and an acrylonitrile copolymer containing a monomer of Formula 1, i.e. N,N-dimethylaminoethyl methacrylate, according to this invention, were respectively prepared by the same manner as that set forth in Example 1, and the resulting copolymers were compared as to their dyeing characteristics. The results are summarized in Table 7. Samples 1 to 3 were the copolymers in which 2-methyl-5-vinyl-pyridine has been incorporated, while samples 4 to 6 were the copolymers containing basic monomers according to this invention.

It will be apparent from Table 7 that the copolymers prepared by the method of this invention exhibited substantially the same affinity for acid dyes when the dyeing bath pH was 7 as when the bath had a pH value of 3 and that, in contrast, the conventional acrylonitrile copolymers containing vinyl pyridines were substantially non-receptive to acid dyes when the dyeing bath pH became 7.

TABLE 7

| | Proportions of monomers charged | Dyeability of polymer [1] | |
|---|---|---|---|
| | | Bath pH=3 | Bath pH=7 |
| Sample No.: | | | |
| 1 | AN:VdCl:VP 87:10:3 | 0.42 | 0.02 |
| 2 | AN:VdCl:VP:VAc 83:10:3:4 | 0.53 | 0.04 |
| 3 | AN:VdCl:VP:MA 83:10:3:4 | 0.45 | 0.03 |
| 4 | AN:VdCl:DAM 87:10:3 | 1.04 | 1.01 |
| 5 | AN:VdCl:DAM:VAc 83:10:3:4 | 1.37 | 1.31 |
| 6 | AN:VdCl:DAM:MA 83:10:3:4 | 1.12 | 1.07 |

[1] The dyeability of each copolymer was a relative value determined in the following manner. Thus, 1 g. of the copolymer was added to a dyeing bath containing 0.2 g. of an acid dye, i.e. C.I. Acid Blue 158 (C.I. No. 14800), and 150 ml. of water, and the copolymer was dyed at 105° C. for 1 hour, with the pH of the dyeing bath being maintained at the varying pH set forth in the above table. After washing with water, the dyed copolymer was dissolved in γ-butyrolactone to a concentration of 0.05 g./100 cc., and the absorbancy, at 530 mμ, of the copolymer solution was colorimetrically determined. It is understood that the greater the value obtained, the higher the affinity of the sample for acid dyes.

In the above table, AN refers to acrylonitrile, VdCl to vinylidene chloride, VP to 2-methyl-5-vinyl pyridine, DAM to N,N-dimethylaminoethyl methacrylate, VAc to vinyl acetate, and MA to methyl acrylate.

EXAMPLE 9

Following the procedure of Example 1, copolymers of the compositions shown in Table 8 were prepared and their solubility in 52% aqueous solution of sodium thiocyanate was measured.

As shown in Table 8, the vinylidene chloride-containing copolymers of Experiments Nos. 1 and 2 which satisfy the Equation of A or B previously indicated were soluble in 52% sodium thiocyanate aqueous solution, while vinylidene chloride-containing copolymers (Experiments Nos. 3 and 4) not satisfying the Equation A or B were not soluble.

TABLE 8

| | Charged monomer composition, percent | | | | Copolymer composition, percent | | | | Intrinsic viscosity | Solubility in 52% NaSCN |
|---|---|---|---|---|---|---|---|---|---|---|
| | AN | VdCl | VAc | DAM | AN | VdCl | VAc | DAM | | |
| Experiment: | | | | | | | | | | |
| 1 | 81 | 7 | 9 | 3 | 80.8 | 7.1 | 8.9 | 3.2 | 0.89 | Soluble. |
| 2 | 78 | 11 | 8 | 3 | 77.7 | 11.1 | 7.2 | 4.0 | 1.02 | Do. |
| 3 | 78 | 14 | 6 | 2 | 77.5 | 14.5 | 5.5 | 2.5 | 0.83 | Insoluble. |
| 4 | 73 | 15 | 9 | 3 | 73.4 | 15.5 | 7.5 | 3.6 | 0.92 | Do. |

NOTE.—AN, VdCl, VAc and DAM are as defined in Table 7. The intrinsic viscosity was determined in the same manner as in Table 2.

What we claim is:

1. In a process for producing spinning solution which comprises dissolving an acrylonitrile copolymer consisting of, by weight, acrylonitrile, vinylidene chloride and 1–5% of a basic monomer of the formula:

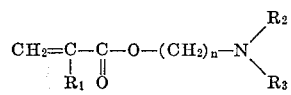

wherein $R_1$ is hydrogen or methyl radical, each of $R_2$ and $R_3$ is methyl or ethyl radical, and $n$ is an integer of from 2 to 4, in an aqueous solution of thiocyanate, the improvement wherein the dissolution is conducted under the satisfaction of the following Equation A or B;

$$5.3 \leq x \leq 7.4 \quad 47 \leq y \leq 60 \quad (A)$$

$$7.4 < x \leq 12.0 \quad 0.8x + 41.1 \leq y \leq 60 \quad (B)$$

wherein $x$ (weight percent) is the content of vinylidene chloride in the copolymer and $y$ (weight percent) is the concentration of the thiocyanate solution.

2. In a process for producing spinning solution which comprises dissolving an acrylonitrile copolymer consisting of, by weight, acrylonitrile, vinylidene chloride, 1-5% of a basic monomer of the formula:

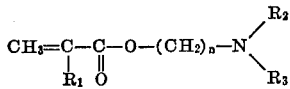

wherein $R_1$ is hydrogen or methyl radical, each of $R_2$ and $R_3$ is methyl or ethyl radical, and $n$ is an integer of from 2 to 4, and 1-15% of at least one neutral ethylenically unsaturated compound, the improvement wherein the dissolution is conducted under the satisfaction of the following Equation A or B:

$$5.3 \leq x \leq 7.4 \quad 47 \leq y \leq 60 \quad \text{(A)}$$

$$7.4 < x \leq 12.0 \quad 0.8x+41.1 \leq y \leq 60 \quad \text{(B)}$$

wherein $x$ (weight percent) is the content of vinylidene chloride in the copolymer and $y$ (weight percent) is the concentration of the thiocyanate solution.

References Cited

UNITED STATES PATENTS

| | | | |
|---|---|---|---|
| 2,827,443 | 3/1958 | Rector et al. | 260—85.5 |
| 2,734,888 | 2/1956 | D'Alelio | 260—80.73X |
| 2,946,762 | 7/1960 | Kocay | 260—29.6AZ |
| 3,310,535 | 3/1967 | Mazzolini et al. | 260—80.73X |

MURRAY TILLMAN, Primary Examiner

H. ROBERTS, Assistant Examiner

U.S. Cl. X.R.

8—55; 260—80.73, 898; 264—78, 182, 206